(12) United States Patent
Artar et al.

(10) Patent No.: US 12,326,870 B2
(45) Date of Patent: Jun. 10, 2025

(54) DEEP CONNECTIVITY BETWEEN DISPARATE DATABASE SYSTEMS

(71) Applicant: Notion Labs, Inc., San Francisco, CA (US)

(72) Inventors: Alp Artar, San Francisco, CA (US); Ryan Hart, Oakland, CA (US); Shir Yehoshua, San Francisco, CA (US)

(73) Assignee: NOTION LABS, INC., San Francisco, CA (US)

( * ) Notice: Subject to any disclaimer, the term of this patent is extended or adjusted under 35 U.S.C. 154(b) by 0 days.

(21) Appl. No.: 18/178,451

(22) Filed: Mar. 3, 2023

(65) Prior Publication Data

US 2024/0296166 A1 Sep. 5, 2024

(51) Int. Cl.
G06F 16/25 (2019.01)
G06F 16/27 (2019.01)
G06F 40/134 (2020.01)

(52) U.S. Cl.
CPC .............. *G06F 16/25* (2019.01); *G06F 16/27* (2019.01); *G06F 40/134* (2020.01)

(58) Field of Classification Search
CPC ......... G06F 16/25; G06F 16/27; G06F 40/134
See application file for complete search history.

(56) References Cited

U.S. PATENT DOCUMENTS

| | | | |
|---|---|---|---|
| 9,325,842 B1 * | 4/2016 | Siddiqi | G06F 3/0482 707/999.003 |
| 10,331,502 B1 * | 6/2019 | Hart | G06F 9/54 707/706 |
| 10,733,206 B2 * | 8/2020 | Newhouse | G06F 16/275 707/706 |
| 2014/0108373 A1 * | 4/2014 | Abrahami | G06F 16/951 707/706 |
| 2016/0127465 A1 * | 5/2016 | Barstow | G06F 16/27 707/620 |
| 2020/0045137 A1 * | 2/2020 | Hart | G06F 16/954 707/706 |
| 2020/0244605 A1 * | 7/2020 | Nagaraja | H04L 51/02 707/706 |
| 2020/0322320 A1 * | 10/2020 | Moon | G06F 21/40 707/706 |

(Continued)

FOREIGN PATENT DOCUMENTS

DE 102013017085 A1 * 4/2014 ........... G06F 16/951

OTHER PUBLICATIONS

DE 102013017085 A1 (Year: 2014).*

*Primary Examiner* — Yuk Ting Choi
(74) *Attorney, Agent, or Firm* — PATENT LAW WORKS LLP (57) ABSTRACT

Systems and methods for deep connectivity between disparate database systems are described. User input to configure a content connectivity module includes a uniform resource identifier (URI) to a resource at a third party system. A bot may be configured with permissions to retrieve data at the resource, scan for links associated with third party objects, each link having a keyword associated with the content block management system. Identifiers of objects in the content block management system may be extracted from the links. Based on the identifiers, a relational connection between each block object and each third party object may be generated.

19 Claims, 9 Drawing Sheets

(56) References Cited

U.S. PATENT DOCUMENTS

2021/0105280 A1* 4/2021 Lansing ................. G06F 9/543
 707/706
2022/0413879 A1* 12/2022 Passey ................ G06F 9/44521
 707/706

* cited by examiner

This is an expansion of steps 404 and 406 of figure 4

## DEEP CONNECTIVITY BETWEEN DISPARATE DATABASE SYSTEMS

FIELD OF THE DISCLOSURE

The present disclosure relates to systems and method for dynamic database relations management. More specifically, the present disclosure relates to systems and method for deep connectivity between disparate database systems.

BACKGROUND

In recent years, millions of databases have been generated by users of productivity software platforms for uses ranging from software development to tracking wedding invites. However, a problem for users trying to manage multiple databases is that users are tasked with the tedious task of updating, manually, various independently managed databases separately, and there is no guarantee that they have correctly and successfully updated the databases. There is not a comprehensive way to relate two disparate and separately managed databases that exist on separate websites and software stacks. It would be useful to have such a method for configuring relationships between databases. While existing websites offer platforms for user-generated databases, generating and configuring mechanisms and methods to relate the databases is impossible without significant time and effort as well as gathering significant information about the user-generated databases and methods of inputting and extracting information from the databases.

SUMMARY

The present disclosure relates to a content block management system that enables thousands of user-generated databases being created to be deeply connected, programmatically, using a relational data management system. A content block management system relies on user-generated and user-managed databases that are accessed through the Internet. The content blocks of a data store may be individually addressed such that a specific Uniform Resource Identifier (URI) may be assigned per block. A third party system may host a user-generated database in which each database item is conceptualized as a synchronized block that maps to a particular block within the content block management system. A user may configure a bot through the content block management system to automatically scan for block URIs on the third party system page hosting the user-generated database such that the database is conceptualized as a synchronized database that maps to a particular database within the content block management system. Thus, once a synced database of synced blocks, residing on the third party system, is properly configured, a deep connection between disparate databases is generated. An application programming interface (API) may be used to facilitate data transfer and integration between the synced database and the content block management system. Additionally, metadata may be attached to data objects on the third party system to connect the content block management system and the third party system. In this way, changes that occur within the content block management system can be reflected in the external data store that resides on the third party system, and similarly, vice versa, to ensure two-way deep data connectivity remains synchronized and automatically and programmatically related between the disparate databases such that information is ready and served timely.

BRIEF DESCRIPTION OF THE DRAWINGS

The techniques introduced herein are illustrated by way of example, and not by way of limitation in the figures of the accompanying drawings in which like reference numerals are used to refer to similar elements.

DETAILED DESCRIPTION

As set forth in detail below, the technology described herein provides an innovative approach to connecting disparate database systems. In particular, the systems and methods described below advantageously generate connectivity between disparate database systems through the content block management system. Part of this process includes configuring a database within a content block management system to be related to a third party system database, further configuring the relations to be "automatic" or otherwise programmatically maintained, enabling a process to automatically scan a third party system page hosting the database for links to the content block management system, determining from the links to identify and isolate a character string to determine a database on the content block management system that is to be automatically related to the database on the third party system, and storing a URI associated with the third party system database to the database in the content block management system and vice versa through an application programming interface.

While the present disclosure will now be described below with regard to user-generated databases on third party systems and the programmatic connecting of those third party system databases to databases on a content block management system, it should be understood that databases are just one example type of data content that may be used with the present disclosure. The present disclosure is applicable to various other types of content including but not limited to relational databases, structured data, unstructured data, NoSQL databases, JSON databases, and so forth.

With reference to the figures, reference numbers may be used to refer to components found in any of the figures, regardless whether those reference numbers are shown in the figure being described. Further, where a reference number includes a letter referring to one of multiple similar components (e.g., component 000a, 000b, and 000n), the reference number may be used without the letter to refer to one or all of the similar components.

Figure 1:
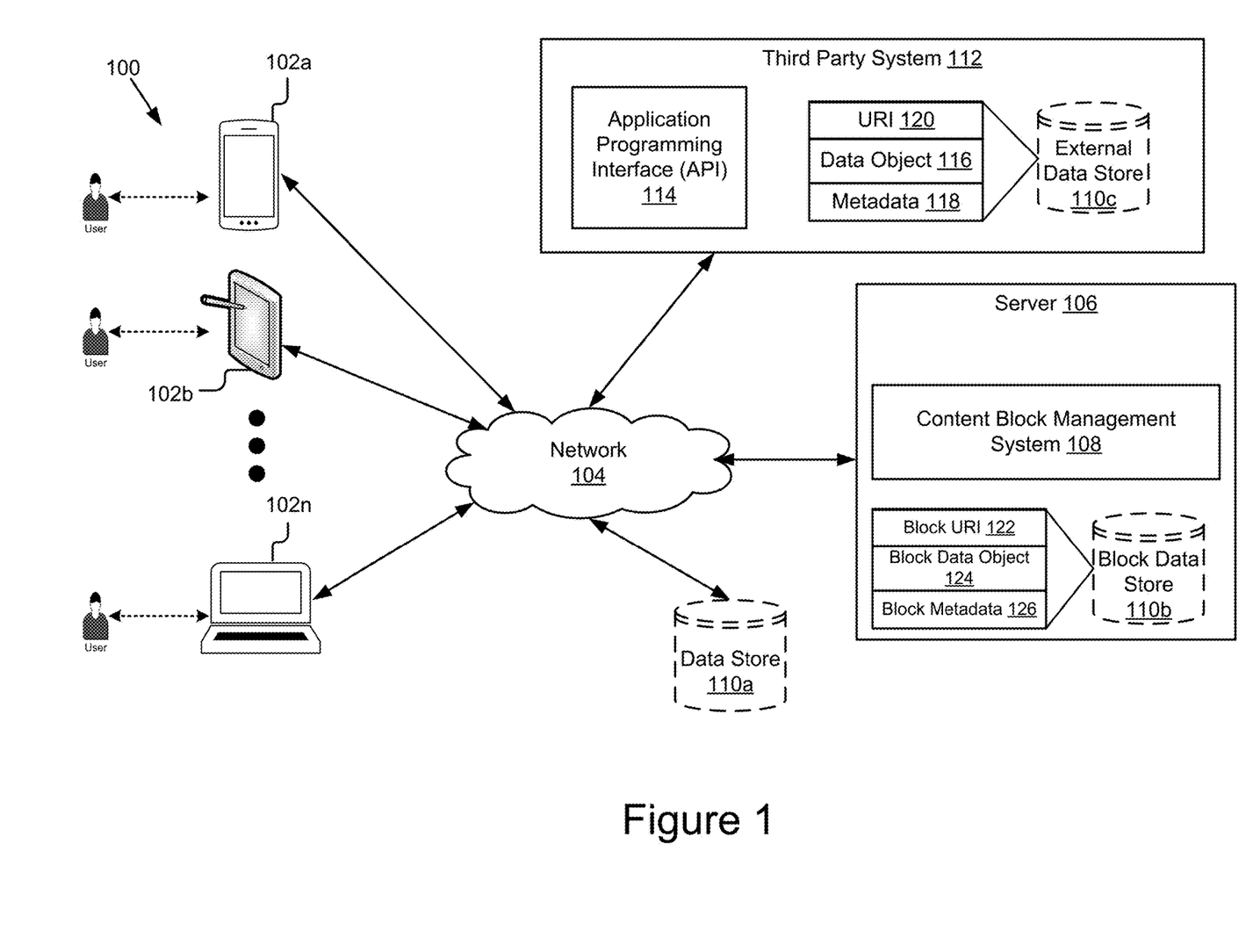
FIG. 1 is a high-level block diagram illustrating a system including a content block management system in accordance with some implementations.

FIG. 1 is a high-level block diagram illustrating an example system 100 for forecasting content demand according to some implementations. The system 100 includes one or more computing devices 102a-102n, a network 104, a server 106, and a third party system 112. While a particular arrangement is depicted in FIG. 1 by way of example, it should be noted that other system configurations are possible including other devices, systems, and networks as well as pluralities of any of the components shown in FIG. 1.

The network 104 may communicatively couple the various components of the system 100. In some implementations, the network 104 is a wired or wireless, and may have numerous different configurations. Furthermore, the network 104 may include a local area network (LAN), a wide area network (WAN) (e.g., the internet), and/or other interconnected data paths across which multiple devices may communicate. In some implementations, the network 104 may be a peer-to-peer network. The network 104 may also be coupled with portions of a telecommunications network for sending data using a variety of different communication protocols. In some implementations, the network 104 may include Bluetooth (or Bluetooth low energy) communication networks or a cellular communications network for sending and receiving data including via short messaging service (SMS), multimedia messaging service (MMS), hypertext transfer protocol (HTTP), direct data connection, wireless access point (WAP), email, etc. Although the example of FIG. 1 illustrates one network 104, in practice one or more networks can connect the entities of the system 100.

The computing device(s) 102 may include one or more computing devices having data processing and communication capabilities. The computing device 102 is coupled to communicate with other components of the system 100 via the network 104. For example, computing device 102a, computing device 102b, and computing device 102n are coupled by respective signal lines the network 104 for communication, cooperation and interaction with the other components of the system 100. While the example of FIG. 1 depicts only a three computing devices 102a, 102b, and 102n, the system 100 may include any number of computing devices 102. Although not shown, the computing device 102 may include a web browser, and/or other applications. The web browser provides functionality for a user using the computing device 102 to interact with the content block management system 108 that is configured as part of the server 106. The computing device 102 may be used by the user to input information, images video or other media or otherwise interact with the content block management system 108 as will be described below.

According to the techniques introduced herein, the operation and interaction of the user computing device 102 with the server 106, in particular, the content block management system 108 is described in more detail below with reference to the processes of FIGS. 4-6. In some implementations, the web browser of the computing device 102 may also be used to present user interfaces. In some implementations, a dedicated application on the user computing device 102 may provide the interface for the user to view capture and view media that have been submitted by the user to the content block management system 108. In some implementations, the user computing device 102 may be a mobile phone, a desktop computer, a laptop, a tablet, or workstation in other similar computing device.

The server 106 has data processing and communication capabilities as will described in more detail below with reference to FIGS. 4-6. The server 106 may be coupled to communicate with other components of the system 100 via the network 104. In some implementations, the server 106 is a hardware server. In other implementations, the server 106 is a combination of a hardware server and the software server. In still other implementations, the server 106 is entirely a software server. The server 106 comprises a content block management system 108 and a data store 110 as are described in more detail below. Although not shown, the server 106 may be integrated into other larger systems responsible for interacting with social networks, learning management systems, or other groups of users.

Figure 2:
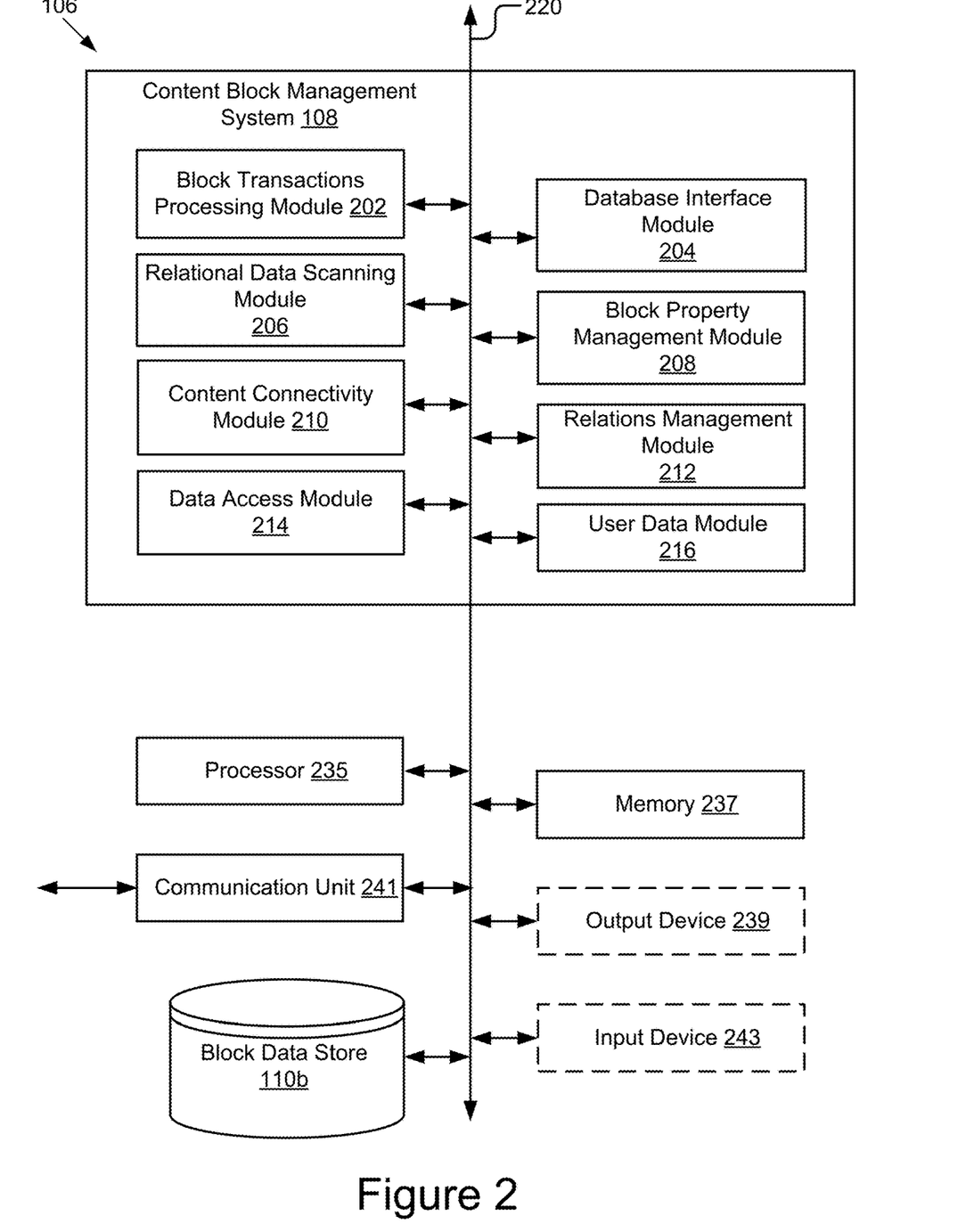
FIG. 2 is a block diagram illustrating a hardware server including the content block management system in accordance with some implementations.

The data storage 110a, 110b, 110c can include one or more non-transitory computer-readable media for storing the data. In some implementations, the data storage 110 may include a database management system (DBMS). For example, the DBMS could include a structured query language (SQL) DBMS, a NoSQL DBMS, various combinations thereof, etc. In some implementations, the DBMS may store data in multi-dimensional tables comprised of rows and columns, and manipulate, e.g., insert, query, update and/or delete, rows of data using programmatic operations. While the block data storage 110b is shown in FIGS. 1 and 2 as being part of the server 106, it should be understood that in some implementations the data storage 110a may be directly coupled to the network 104 and not included in the server 106. The server 106 would access the data storage 110 via the network 104 in such an implementation. The block data store 110b may include a number of block data objects 124 that represent the data being stored in the content block management system 108. Each block may include a block URI (Uniform Resource Identifier) 122 and block metadata 126 associated with the block, such as name, description, user creator, and so forth.

The third party system 112 may include an external data store 110c and an application programming interface (API) 114 for accessing and storing data within the external data store 110c. The external data store 110c may include various data objects 116 that each have metadata 118 and a Uniform Resource Identifier (URI) 120 associated with each data object 116. As an example, a third party system 112 may include a database of user-generated pull requests where the third party system 112 enables users to track and manage code changes associated with a software engineering project, such as GITHUB or JIRA. Other types of third party systems 112 may utilize user-generated databases that are used for different purposes.

Referring now to FIG. 2, one example of a server 106 including the content block management system 108 is shown. In some implementations, the server 106 comprises the content block management system 108, a processor 235, memory 237, a communication unit 241, the block data storage 110b, an output device 239, and an input device 243. The content block management system 108, the processor 235, memory 237, the communication unit 241, the data storage 110, the output device 239, and the input device 243 are communicatively coupled to each other for communication and cooperation by the bus 220. The server 106 depicted in FIG. 2 is provided by way of example and it should be understood that it may take other forms and include additional or fewer components without departing from the scope of the present disclosure. For instance, various components of the server 106 may be coupled for communication using a variety of communication protocols and/or technologies including, for instance, communication buses, software communication mechanisms, computer networks, etc. While not shown, the server 106 may include various operating systems, sensors, additional processors, and other physical configurations. The processor 235, memory 237, communication unit 241, etc., are representative of one or more of these components.

The bus 220 can include a communication bus for transferring data between components of the server 106, a network bus system including the network 104 or portions thereof, a processor mesh, a combination thereof, etc. In some implementations, the various components of the server 106 cooperate and communicate via a communication mechanism included in or implemented in association with the bus 220. In some implementations, the bus 220 may be a software communication mechanism including and/or facilitating, for example, inter-method communication, local function or procedure calls, remote procedure calls, an object broker (e.g., CORBA), direct socket communication (e.g., TCP/IP sockets) among software modules, UDP broadcasts and receipts, HTTP connections, etc. Further, communication between components of server 106 via bus 220 may be secure (e.g., SSH, HTTPS, etc.).

The processor 235 may execute software instructions by performing various input, logical, and/or mathematical operations. The processor 235 may have various computing architectures to process data signals (e.g., CISC, RISC, etc.). The processor 235 may be physical and/or virtual, and may include a single core or plurality of processing units and/or cores. In some implementations, the processor 235 may be coupled to the memory 237 via the bus 220 to access data and instructions therefrom and store data therein. The bus 220 may couple the processor 235 to the other components of the server 106 including, for example, the content block management system 108, the communication unit 241, and the output device 239. The processor 235 is also coupled by the communication unit 241 to signal line and the network 104 to retrieve and store information from the other components of the system 100.

The memory 237 may store and provide access to data to the other components of the server 106. The memory 237 may be included in a single computing device or a plurality of computing devices. In some implementations, the memory 237 may store instructions and/or data that may be executed by the processor 235. The memory 237 is also capable of storing other instructions and data, including, for example, an operating system, hardware drivers, other software applications, databases, etc. (not shown). The memory 237 may be coupled to the bus 220 for communication with the processor 235 and the other components of server 106. The memory 237 may include a non-transitory computer-usable (e.g., readable, writeable, etc.) medium, which can be any non-transitory apparatus or device that can contain, store, communicate, propagate or transport instructions, data, computer programs, software, code, routines, etc., for processing by or in connection with the processor 235. In some implementations, the memory 237 may include one or more of volatile memory and non-volatile memory (e.g., RAM, ROM, flash memory, hard disk, optical disk, etc.). It should be understood that the memory 237 may be a single device or may include multiple types of devices and configurations.

The output device 239 may be any device capable of outputting information from the server 106. The output device 239 may include one or more of a display (LCD, OLED, etc.), a printer, a 3D printer, a haptic device, audio reproduction device, touch-screen display, a remote computing device, etc. In some implementations, the output device 239 is a display which may display electronic images and data output by a processor, such as processor 235, of the server 106 for presentation to a user. The output device 239 is shown with dashed lines in FIG. 2 to indicated that it is optional.

The communication unit 241 may include one or more interface devices (I/F) for wired and/or wireless connectivity among the components of the server 106 and the network 104. For instance, the communication unit 241 may include, but is not limited to, various types of known connectivity and interface options. The communication unit 241 may be coupled to the other components of the server 106 via the bus 220. The communication unit 241 can provide other connections to the network 104 via signal line and to other systems, devices and databases of the system 100 using various standard communication protocols.

The input device 243 may include any device for inputting information into the server 106. In some implementations, the input device 243 may include one or more peripheral devices. For example, the input device 243 may include a keyboard, a pointing device, microphone, an image/video capture device (e.g., camera), a touch-screen display integrated with the output device 239, etc. The input device 243 is shown with dashed lines in FIG. 2 to indicated that it is optional.

In some implementations, the content block management system 108 has components that work as follows. Users create and edit databases through user input interactions with web pages and/or applications provided by the server 106 that are stored in a data store 110. The content block management system 108 generates, analyzes, and/or retrieves information about the user-generated data and the users (e.g., user behavior on the databases such as the number of content blocks users have created, location of the users viewing the page, prior activities of the user, and channel where the user is viewing the page). As users create content within the content block management system 108, each piece of content, whether a page, a database, or some other type of content item, is processed as a content block with a URI.

As shown in FIG. 2, the content block management system 108 comprises a block transactions processing module 202, a database interface module 204, a relational data scanning module 206, a block property management module 208, a content connectivity module 210, a relations management module 212, a data access module 214, and a user data module 216. These modules, their configuration, structure and functionality are described below in more detail collectively and individually with reference to FIGS. 3-8. In some implementations, the block transactions processing module 202, the database interface module 204, the relational data scanning module 206, the block property management module 208, the content connectivity module 210, the relations management module 212, the data access module 214, and the user data module 216 are sets of instructions stored in the memory 237 executable by the processor 235 to provide their respective acts and/or functionality. In any of these implementations, the block transactions processing module 202, the database interface module 204, the relational data scanning module 206, the block property management module 208, the content connectivity module 210, the relations management module 212, the data access module 214, and the user data module 216 may be adapted for cooperation and communication with each other, the processor 235 and other components of the server 106 by the bus 220. The components 202, 204, 206, 208, 210, 212, 214, and 216 are also coupled to the network 104 via the communication unit 241 for communication and interaction with the other systems, devices and databases of the system 100.

The block transactions processing module 202 may be steps, processes, functionalities, software executable by a processor, or a device including routines for processing block transactions by the content block management system 108. A block transactions processing module 202 processes transactions occurring on blocks within the content block management system 108. As described above, as users interact with pages and content blocks within the content block management system 108, such as a database, a transaction occurs on the content block. A block transaction may include a read, write, or delete for each piece of content within the content block management system 108, in an embodiment.

The database interface module 204 may be steps, processes, functionalities, software executable by a processor, or a device including routines for interfacing with various databases, including third party systems, to generate, analyze, and/or retrieve information about content created within the content block management system 108, in an embodiment. In some implementations, the database interface module 204 includes application programming interfaces (APIs) to connect disparate database systems. In an embodiment, a user-generated database may be accessed by third party systems through a unique Uniform Resource Identifier (URI).

The user data module 216 may be steps, processes, functionalities, software executable by a processor, or a device including routines for receiving user data from internal and external systems. The user data module 216 can receive user generated data from the server 106 providing the content systems being analyzed and maintained by the content block management system 108, such as the number of times a database is being accessed, an amount of data being transferred, the number of transactions (e.g., reads, writes, or deletes) by a user, and so forth. The user data module 216 may connect over the network 104 to a third-party system (not shown) to retrieve similar user data about the content block management system 108 and/or other database systems. In other implementations, other sources of user data may be gathered by the user data module 216, such as social networking data retrieved from social networks, other metadata from third-party systems, and other publicly available data. User data may be stored in a content block management system 108, in an embodiment. Additionally, users may generate a listing of URIs to content blocks in the content block management system 108 on a third party website, such as an external object instance page (EOIP) of the third party system. Each URI to a content block may be stored in an external collection instance (ECI), such as a data store, on the third party system. EOIPs may be referred to as "synced blocks" and the ECI may be referred to as a "synced database" in various embodiments.

The relational data scanning module 206 may be steps, processes, functionalities, software executable by a processor, or a device including routines for determining matching block identifiers for content blocks in the content block management system 108 as identified in uniform resource identifiers (URIs). The relational data scanning module 206 uses regular expression (regex) matching to detect block pointers that match blocks in a content block management system 108. In an embodiment, a block pointer (or block identifier) may be recognized as part of a URI as listed in a EOIP or ECI by the relational data scanning module 206 as performed by a bot. For example, the bot may perform a block detection heuristic, such as scanning one or more properties of the EOIP, including title, text, and URI. A match may be found using various code snippets, such as "export const TASK_URL_REGEX="https://my.site.com/.+([0-9a-f]{32})")" in various embodiments. In another embodiment, machine learning may be used to accomplish the same task of identifying related content blocks in the content block management system 108 from the third-party system. In other embodiments, a unique identifier (UID) property may be similarly scanned and recognized by the relational data scanning module 206. For example, a UID property, such as collection namespace "PROP-1", may be identified in an existent block in a collection that is related to EOIP's parent ECI.

The block property management module 208 may be steps, processes, functionalities, software executable by a processor, or a device including routines for determining and managing a content block's properties in the content block management system 108. The block property management module 208 can determine and differentiate content block properties, such as a "relations" property that indicates a ECI is related to a particular database in the content block management system 108. In an embodiment, a similar "relation" type property exists in the ECI that points to another database. These properties are added manually by an end user to the Synced Database, in an embodiment.

The content connectivity module 210 may be steps, processes, functionalities, software executable by a processor, or a device including routines for connecting content between a list of block pointers to the related databases. The content connectivity module 210 is configured to facilitate data connection from the third party system 112 to the server 106 through the network 104, where the data connection is facilitated based on managing different types of permissions for a bot, as described below with respect to data access module 214. The content connectivity module 210 is configured to enable a bot to form relations automatically between the external object instance page (EOIP) on the third party system 112 and the destination blocks in the same post-transaction hook, during block pointer detection as described above. Transaction validations may be added to ensure the bot can only modify the relations, in an embodiment. The content connectivity module 210 may include an application programming interface (API) to facilitate data exchange, in an embodiment.

The relations management module 212 may be steps, processes, functionalities, software executable by a processor, or a device including routines for determining a status of relations between the synced databases and synced blocks. For example, a set of pull requests in an external database (e.g., synced database) may be stored in a content block management system 108 in synced blocks. Users may set up an auto-relations property on a synced database such that if a block pointer is detected on the third party system, such as the EOIP, a relation to the block is formed automatically. In an embodiment, a particular synced database level setting to "enable auto-relations" may be checked to automatically form auto-relations. In another embodiment, an auto-relation setting at a property level "enable auto-relations" may be checked to automatically form auto-relations only to that property. Thus, the relations management module 212 may generate different types of auto-relations based on the type of property setting. The "relation" type property exists in the external collection instance (ECI) that points to another database in the content block management system 108. These properties may be added manually by the end-user, in an embodiment.

The data access module 214 may be steps, processes, functionalities, software executable by a processor, or a device including routines for enabling access to data for various systems. In general, data access may be provided to one or more computing systems through a permissions-based schema, where based on a level of permissions granted, access may be enabled. In an embodiment, third-party systems may use bots that have access to a content block management system 108 through a permissions special casing that grants editor access to the bot if its identifier is the same as the identifier stored in a particular object on the content block management system 108. For example, the bot may have access to synced databases and synced blocks due to a permissions special casing that grants editor access to the bot if its identifier (ID) is the same as the one stored in a specified variable (e.g., "format.bot_id") the content block management system 108. Additional permission special casing may be given to the bot to allow access to modify any relation column that is related to a synced database that contains the bot ID in a specified variable (e.g., "format.bot_id"). In an embodiment, the data access module 214 enables a user interface to allow a user to enable the same bot to modify pages in the related database in the content block management system 108 by setting up the auto-relation via a property or a setting of the database. In this way, two-way relations may be created, automatically. In other embodiments, other permissions may be granted. For example, during the process of setting up an auto-relation, the permissions of the related database in the content block management system 108 may be updated to include the bot. As another example, the user who owns the bot may be identified such that the permissions granted to that user may be used for the bot where the relation change is attributed to the bot. In a further example, a new internal actor may be used to represent the automation. This new internal actor may then be assigned the permissions needed to perform the two-way relations between the third-party system and the content block management system 108. This new internal actor would have permissions independent from the user's permissions, and existing calculations and validations may be impacted. In yet another further embodiment, permission checks may be bypassed using an administrator actor and attributing the action to the bot.

The user data module 216 may be steps, processes, functionalities, software executable by a processor, or a device including routines for capturing, retrieving, and/or generating user data in the content block management system 108. As described above, user behavior data on content blocks presented on the content block management system 108 may be captured as user data by the user data module 216. Additionally, as described above, user data may include granted permissions to access data that may be used by the data access module 214 to enable a bot access to a particular data set.

Figure 3:
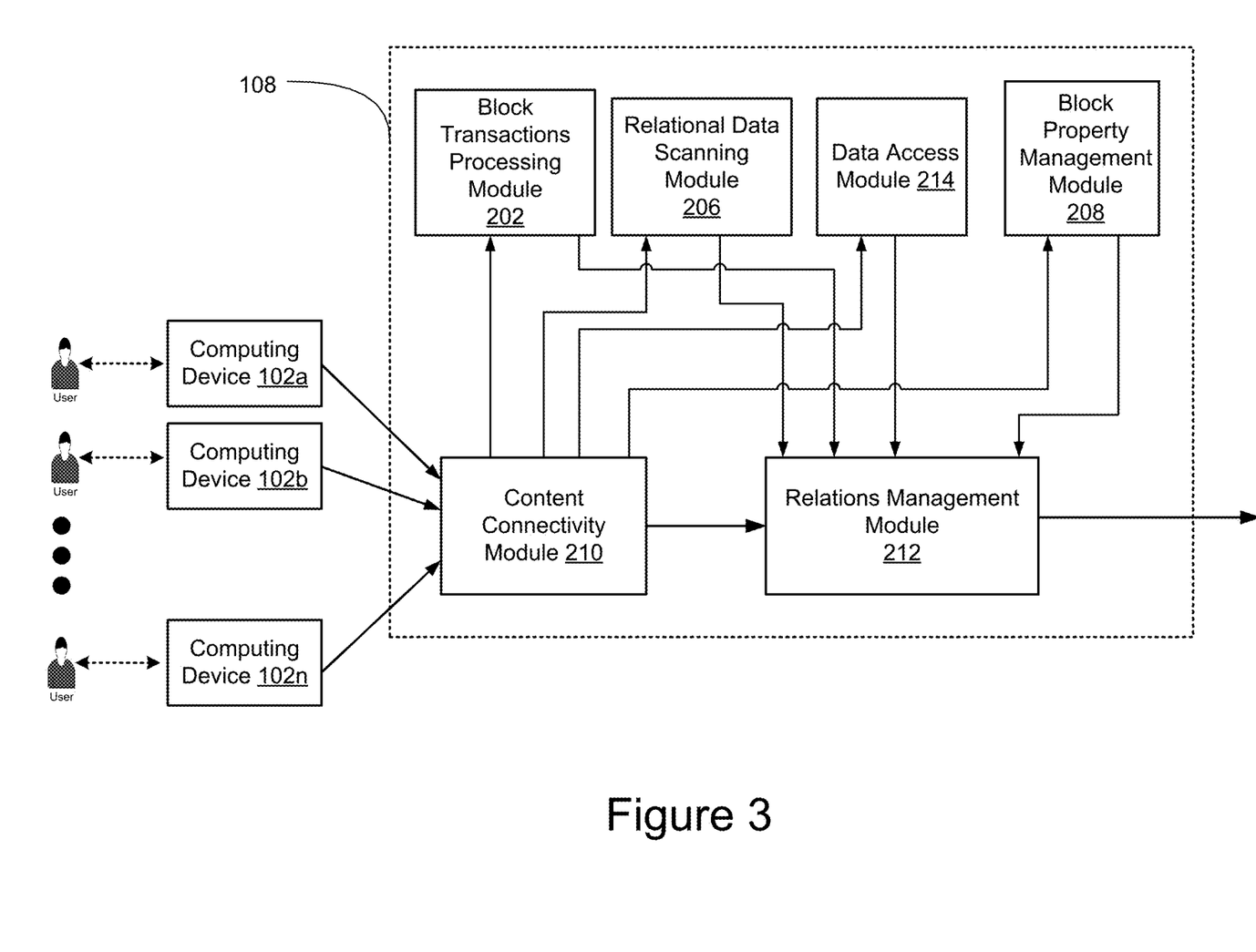
FIG. 3 is a diagram showing the data flow through the content block management system in accordance with some implementations.

Referring now to FIG. 3, the flow 300 of data through the server 106, and in particular, the content block management system 108, in accordance with some implementations is shown. The computing devices 102*a*-102*n* of respective users interact with the content connectivity module 210 of the content block management system 108 to ensure that content inputted on the computing devices 102 are synchronized to the content block management system 108. As noted above, each computing device 102 may operate an application that includes a user interface that presents "content blocks" that are configured to receive content from users, including various types of content, such as text, images, videos, links to webpages, and so on. Several content blocks may be organized onto a "page" within the content block management system 108, which itself may be a content block. The content blocks may include various types of text, such as different types of lists, bullet points, numbered lists, outlined lists, drop down lists, and so on. Content blocks may also include various types of databases, including a simple table, a database of blocks, a collection of databases, and so forth. Content blocks may also enable a user to present various types of information in a single block, such as tabbed content similar to a slideshow presentation, as well as other content from other websites. As described above, links to external databases, such as pull requests on GITHUB, may be inputted by a user into a content block to track a task list, for example. The computing devices 102 send user interaction data (e.g., user inputted data, arrangement of content blocks, configuration data for user-generated databases and pages, and so forth) to the content connectivity module 210. Additionally, other user data, such as related content on external systems, page exit percentage data, may be captured and used as data in the content block management system 108. Furthermore, external data may be brought into the content block management system 108 through one or more application programming interfaces, in an embodiment.

As shown in FIG. 3, the content connectivity module 210 receives the data from the respective computing devices as just described. The content connectivity module 210 pushes user interaction data about inputted data in the content block management system 108 and related content on external systems to the block transactions processing module 202. The content connectivity module 210 additionally pushes other user data to the block transactions processing module 202, such as the property settings to set up auto-relations, which points to an external database and may be manually set up by an end-user. The content connectivity module 210 may also receive other user generated data, such as comments on a page, assigned tasks to other members of a team workspace, and so forth. The content connectivity module 210 is configured to share the received user interaction data to the user data module 216 (not pictured in FIG. 3).

The relations management module 212 is configured to receive information from the block transactions processing module 202, relational data scanning module 206, data access module 214, and block property management module 208. Using this information from these components 202, 206, 214, 208, the relations management module 212 manages a two-way connectivity of data inputted to the content block management system 108 and detected block pointers on "synced databases," automatically. For example, the process of detecting block pointers after every external object instance page (EOIP) type block update or create operation based on the data received from the content connectivity module 210 as well as other data from the aforementioned components 202, 206, 214, 208. For example, block pointer detection may be implemented by updating an external object instance blocks queue task, in an embodiment. As another example, block pointer detection may be implemented as a post transaction hook to be executed after EOIP updates. As described above, different types of links may be detected, including uniform resource identifiers (URIs) to blocks in the content block management system 108, unique identifier properties of objects within the content block management system 108, and URIs to third party systems. For example, a bot may scan the updated EOIP properties of type "title," "text," and "URI." Using regular expression matching (regex), the value may be matched with URIs to blocks in the content block management system 108, unique identifier properties of objects in the content block management system 108, and URIs to third party systems. Matched regular expression will return a block identifier, in an embodiment. The relations management module 212 may then retrieve the block identifier to determine whether it is an existent block in a collection that is related to the EOIP's parent ECI. Once there's a list of block pointers to the related databases, relations can be formed between the EOIP and the destination blocks by the relations management module 212. This can occur in the same post-transaction hook, in the block pointer detection step, in an embodiment. In other embodiments, other types of matching may be performed to identify a keyword that returns an identifier, such as a task identifier or other custom identifier. The task identifier or other custom identifier may, for example, be used to identify an underlying block identifier. This may be performed through a lookup in a database or by an API call to an application server, for example.

Figure 4:
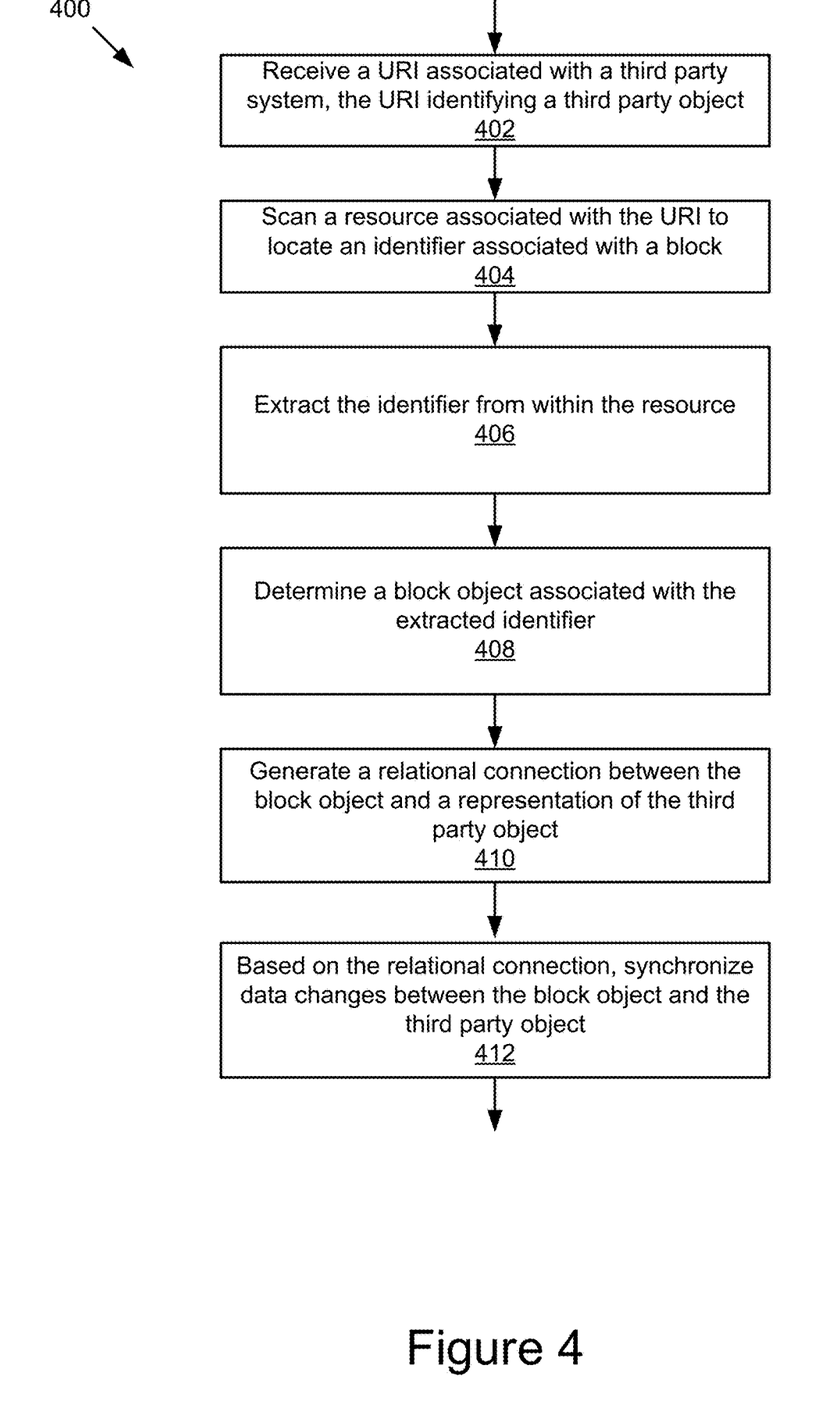
FIG. 4 is a flow diagram showing a method for deep connectivity between disparate database systems using content block management in accordance with some implementations.

Referring now to FIG. 4, a general method 400 for deep connectivity between disparate database systems using content block management in accordance with some implementations is described. The method 400 begins by receiving 402 a URI associated with a third party system, the URI identifying a third party object, as has been described above. Next, the method 400 scans 404 a resource (such as a webpage) associated with the URI to locate an identifier associated with a block. The method 400 continues to extract 406 an identifier from within the resource. Identifiers may include a block identifier or an identifier of an object within a content block management system 108, for example. The method 400 then determines 408 a block object associated with the extracted identifier. For example, regular expression matching, as described above, is used to identify a block that exists in a related collection. The method 400 continues by generating 410 a relational connection between the block object and the third party object. For example, the relational connection may be automatically creating a relation between the EOIP and the destination block by setting a property for auto-relations to be turned on. The method 400 continues by synchronizing 412, based on the relational connection, data changes between the block object and the third party object. For example, the block object may have a property that indicates status of a task, such as "In Progress", "To-Do", or "Done". Similarly, the third party object may have a similar status property. An update to the block object, such as to mark the task object "Done" within the content block management system 108, may be synchronized 412, based on the relational connection, to update a status property on the third party object in the third party system, in an embodiment.

Figure 5:
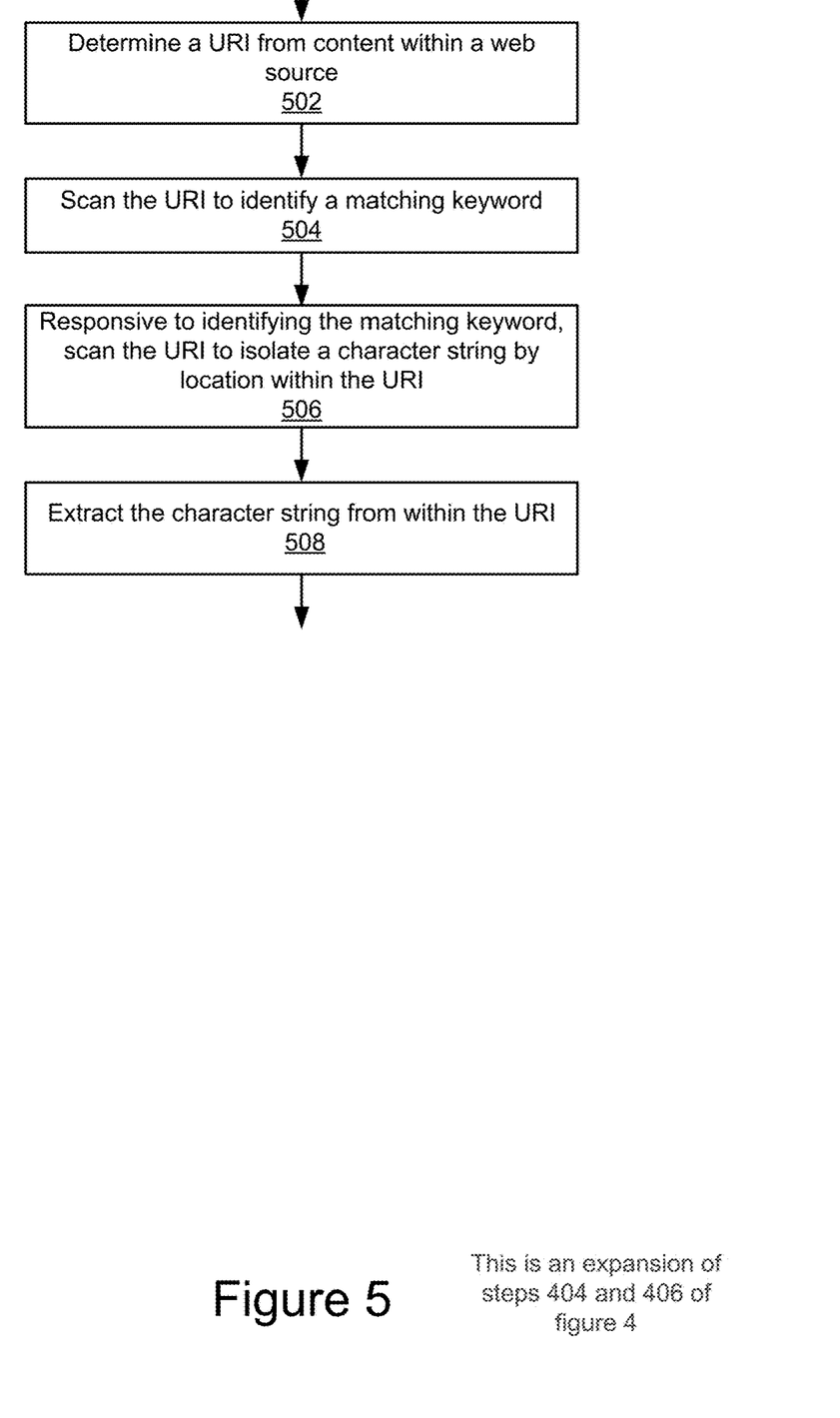
FIG. 5 is a flow diagram showing a method for connecting disparate database systems in accordance with some implementations.

Referring now to FIG. 5, a method 500 for connecting disparate database systems in accordance with some implementations is described. The method 500 is an expansion of steps 404 and 406. The method 500 begins by determining 502 a URI from content within a resource (such as a webpage). Next, the method 500 scans 504 the URI to identify a matching keyword. The method 500 continues by scanning 506, responsive to identifying the matching keyword, the URI to isolate a character string by location within the URI. Then the method 500 extracts 508 the character string from within the URI. For example, the block identifier may be extracted from the URI. As another example, a task identifier may be extracted from the URI and a database may be accessed to identify a block identifier associated with the task identifier extracted from the URI. As a further example, the block identifier may be retrieved through an API using the task identifier extracted from the URI.

Figure 6:
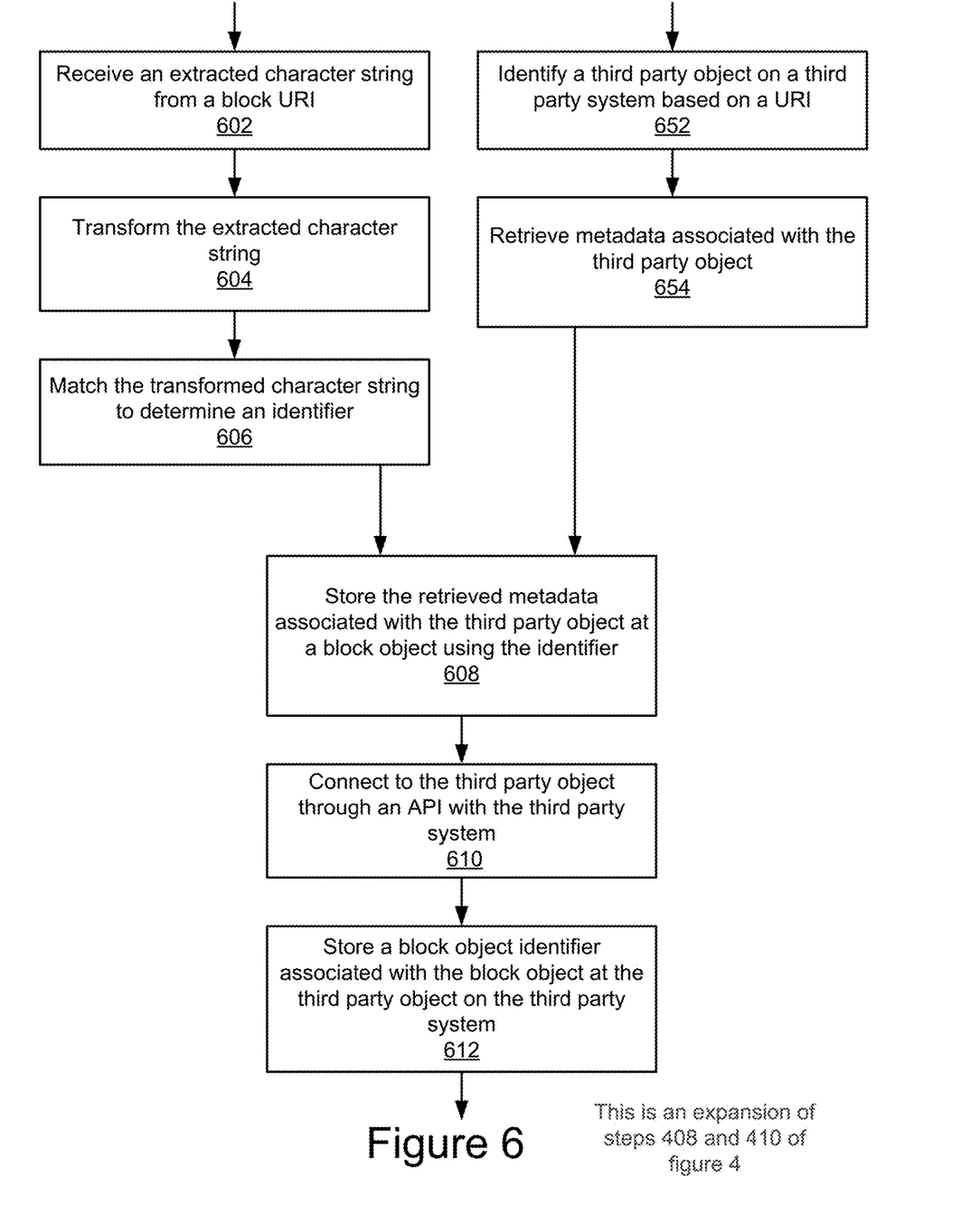
FIG. 6 is a series of flow diagrams showing a method for programmatically connecting disparate database systems in accordance with some implementations.

Referring now to FIG. 6, a method for programmatically connecting disparate database systems in accordance with some implementations is described. With respect to FIG. 6, the method begins by receiving 602 an extracted character string from a block URI. Then, the method transforms 604 the extracted character string. Then, the transformed character string is matched 606 to determine an identifier. In an embodiment, the identifier may be a block object identifier. In other embodiments, the identifier may be a task identifier or other custom identifier.

Separately, the method may identify 652 a third party object on a third party system based on a URI. Next, metadata associated with the third party object may be retrieved 654. For example, the "title", "text" and "URI" associated with third party object may be retrieved from the third party system.

Next, the method continues by storing 608 the retrieved metadata associated with the third party object at a block object using the identifier. For example, if the identifier is a block object identifier, then the block object may be located using the identifier. If the identifier is a task identifier or other custom identifier, other processes may be used to locate the block object, such as a database lookup or an API call. The method continues by connecting 610 to the third party object through an API with the third party system. Next, the method stores 612 the block object identifier associated with the block object at the third party object on the third party system, as described above. Thus, the two-way deep connectivity between the disparate database systems is achieved.

Figure 7A:
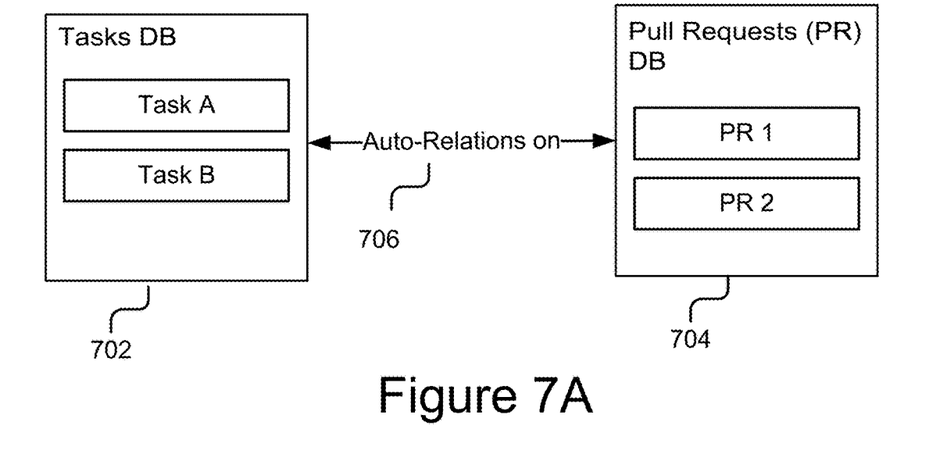
FIGS. 7A and 7B are example high-level block diagrams illustrating a method for programmatically connecting disparate database systems in accordance with some implementations.
Figure 7B:
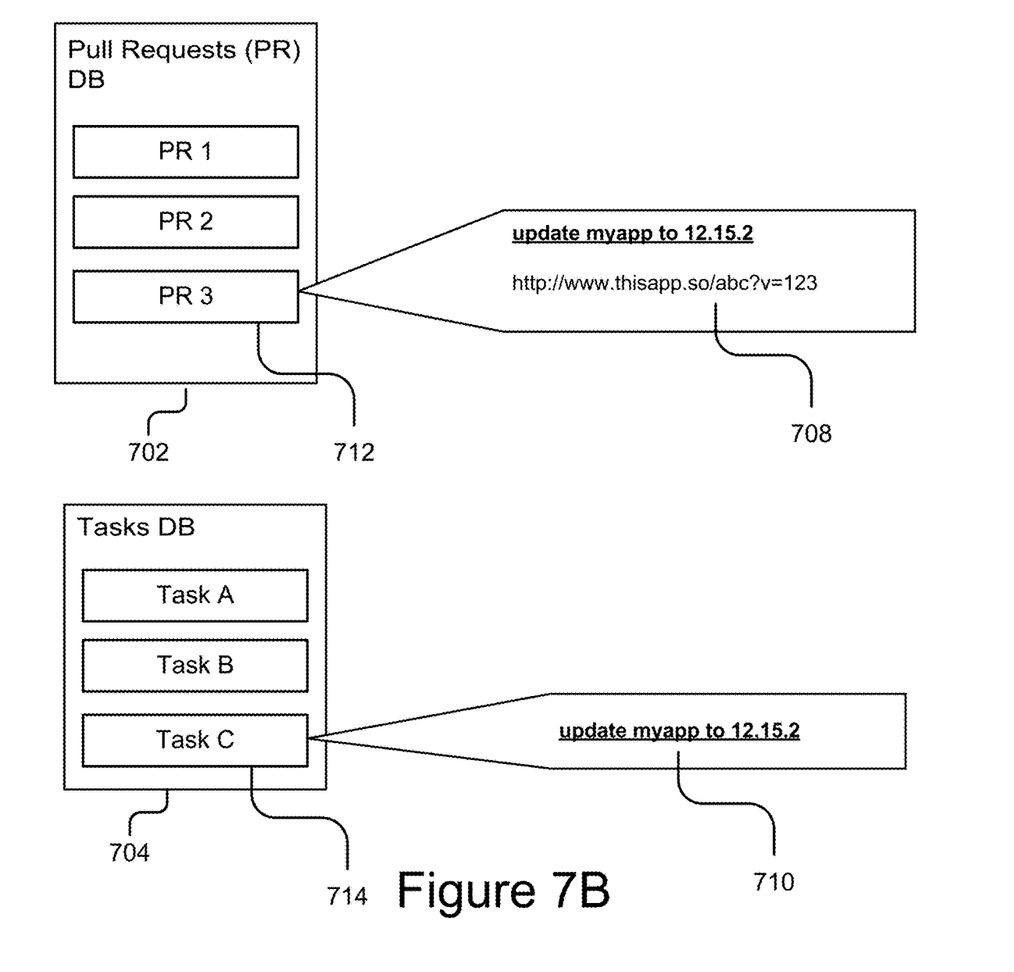

Referring now to FIGS. 7A and 7B, example high-level block diagrams illustrating a method for programmatically connecting disparate database systems in accordance with some implementations is described. FIG. 7A illustrates an example use case where a tasks database 702 within a content block management system includes Task A and Task B. An external system, such as GITHUB, may host a Pull Requests (PR) database 704 that includes Pull Request 1 and Pull Request 2. In this example, "Auto-Relations" property 706 has been turned on such that the tasks database 702 and the PR database 704 have two-way deep connectivity, even though the objects reside on disparate database systems.

FIG. 7B illustrates the situation where a new Pull Request 712 is added to the PR database 704 on the external system. For example, a new Pull Request 712 represents a new task that needs to be completed, such as fixing a bug, or as shown in FIG. 7B, "update myapp to 12.15.2" with a URI 708 of "http://www.thisapp.so/abc?v=123". Because the Auto-Relations property is turned on, a task 714 is updated in the tasks database 702 with an entry 710 that copies the text of the PR, "update myapp to 12.15.2". This is because the relations management module 212, as described above, receives information from the content connectivity module 210 and/or other components of the content block management system 108 that indicates the EOIP, here the PR database, has been updated with a PR.

Figure 8A:
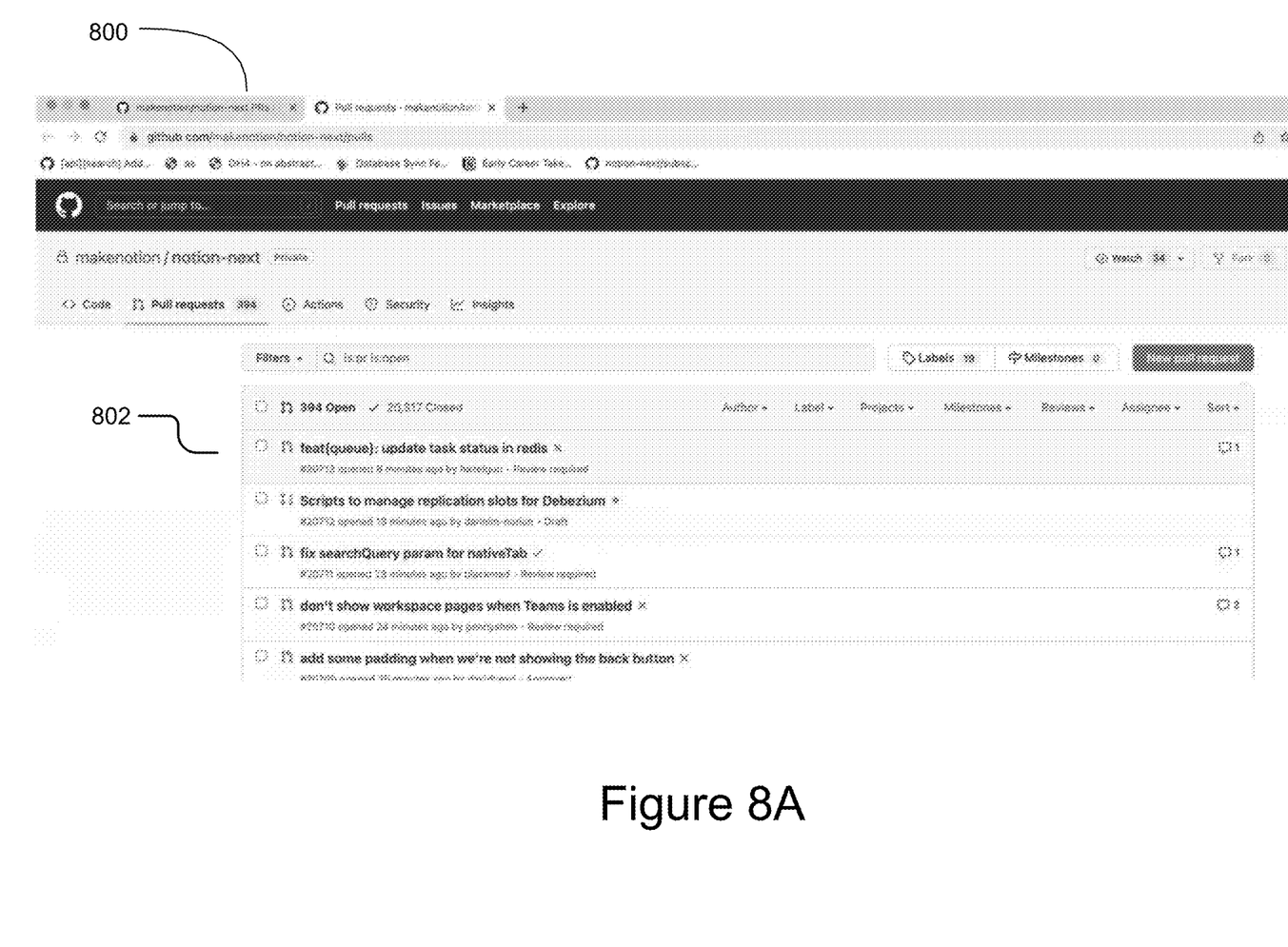
FIGS. 8A and 8B are example screenshots illustrating one implementation for the steps performed by the content block management system.
Figure 8B:
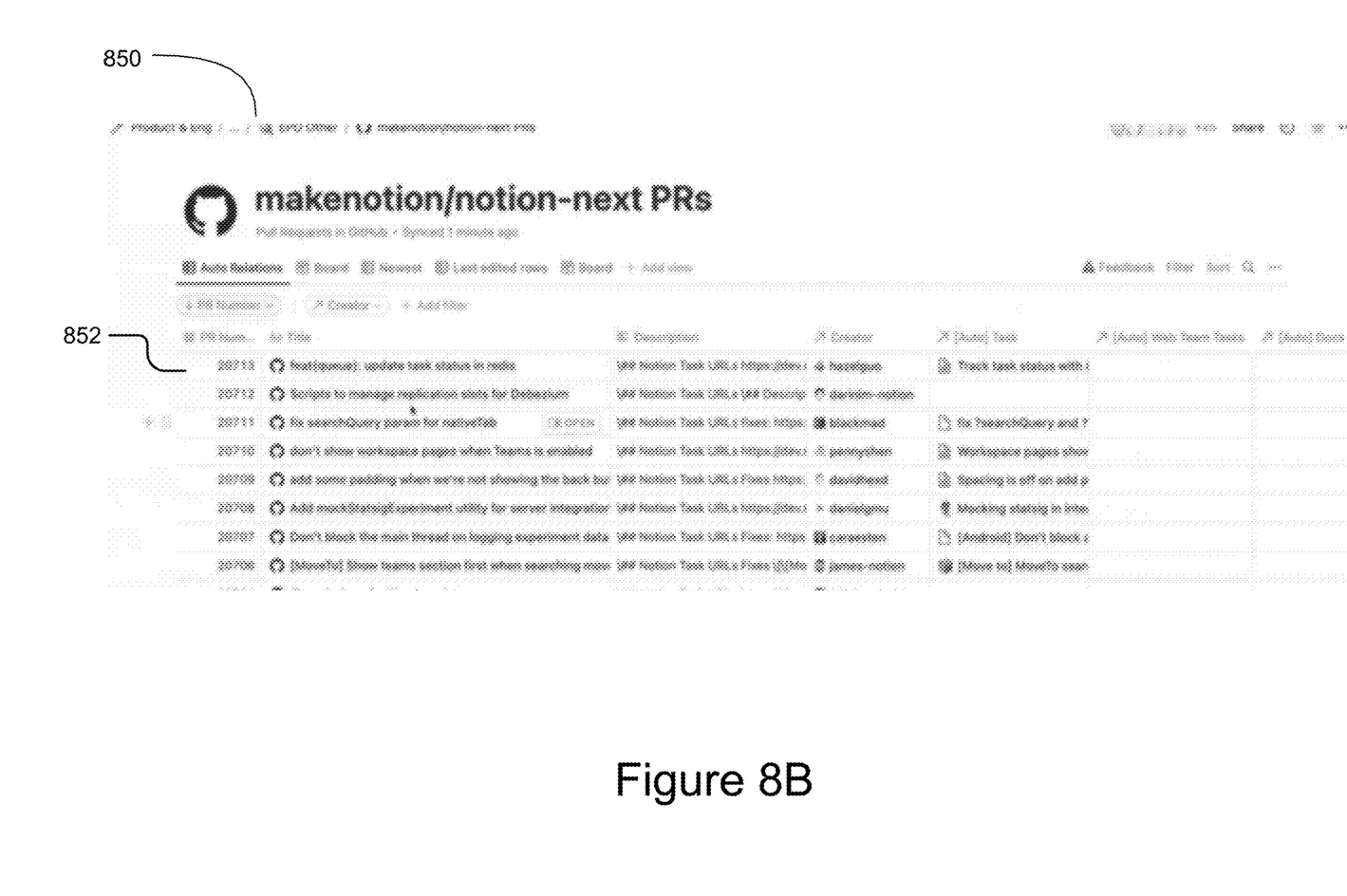

Referring now to FIGS. 8A and 8B, example screenshots illustrating one implementation for the steps performed by the content block management system are described. For example, FIG. 8A shows an example screenshot of a web browser 800 that shows a web page illustrating a database 802 of pull requests. An example pull request 804 is titled "fix searchQuery param for nativeTab." FIG. 8B illustrates an example screenshot of a web browser 850 that shows a web page illustrating a tasks database 852 that has "Auto-Relations" property turned on with the PR database 802 of FIG. 8A. As shown in FIG. 8B, a task 854 with the same title "fix searchQuery param for nativeTab" is included in the tasks database 852 that corresponds with the pull request 804.

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and operations on data within a computer memory. An algorithm is here, and generally, conceived to be a self-consistent set of operations leading to a desired result.

To facilitate description, some elements of the system and/or the methods are referred to using the labels first, second, third, etc. These labels are intended to help to distinguish the elements but do not necessarily imply any particular order or ranking unless indicated otherwise.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The technology described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of an entirely hardware implementation, an entirely software implementation, or implementations containing both hardware and software elements. For instance, the technology may be implemented in software, which includes but is not limited to firmware, resident software, microcode, etc. Furthermore, the technology can take the form of a computer program object accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

The structure, algorithms, and/or interfaces presented herein are not inherently related to any particular computer or other apparatus. Various general-purpose systems may be used with programs in accordance with the teachings herein, or it may prove convenient to construct more specialized apparatus to perform the described methods. The structure for a variety of these systems will be apparent from the description above. In addition, the techniques introduced herein are not described with reference to any particular programming language. It will be appreciated that a variety of programming languages may be used to implement the techniques as described herein.

The foregoing description has been presented for the purposes of illustration and description. It is not intended to be exhaustive or to limit the techniques to the precise form disclosed. Many modifications and variations are possible in light of the above teaching. As will be understood by those familiar with the art, the techniques may be implemented in other specific forms without departing from the spirit or essential characteristics thereof. Likewise, the particular naming and division of the modules, routines, features, attributes, methodologies and other aspects are not mandatory or significant, and the mechanisms that implement the techniques or its features may have different names, divisions and/or formats.

What is claimed is:

1. A computer-implemented method, comprising:
receiving a uniform resource identifier (URI) associated with a third party system, the URI identifying a third party object in an external database on the third party system external to a content block management system;
retrieving, from the external database on the third party system, a content resource associated with the URI;
scanning the content resource to locate a block identifier associated with a content block in the content block management system;
extracting the block identifier of the content block from within the content resource;
determining, based on the block identifier, a block object within the content block management system corresponding to the content block;
generating a relational connection between the block object and a representation of the third party object, wherein the relational connection is generated by automatically forming a relations property on the content block within the content block management system based on the extracted block identifier determining the block object within the content block management system; and
based on the relational connection, enabling two-way connectivity between the block object within the content block management system and the third party object in the external database, wherein enabling the two-way connectivity synchronizes each data change to the block object by updating the third party object with the each data change.

2. The method of claim 1, wherein the block identifier comprises a keyword associated with the content block management system.

3. The method of claim 1, wherein generating the relational connection further comprises:
storing the URI identifying the third party object in the content block management system in association with the block object.

4. The method of claim 1, wherein enabling the two-way connectivity between the block object and the third party object further comprises synchronizing content updates at the third party object in the external database with the block object within the content block management system.

5. The method of claim 4, wherein the two-way connectivity between the block object and the third party object is enabled through a permissions scheme.

6. The method of claim 4, wherein synchronized data transferred based on the two-way connectivity between the block object and the third party object utilizes an application programming interface connecting the content block management system and the third party system.

7. The method of claim 1, wherein generating the relational connection further comprises:
storing the block identifier extracted from within the content resource at the third party system in association with the third party object.

8. A system, comprising:
a processor;
a non-volatile memory;
a content block management application, operable by the processor on the non-volatile memory, the content block management application configured to:
receive a uniform resource identifier (URI) associated with a third party system, the URI identifying a third party object in an external database on the third party system external to a content block management system;
retrieve a content resource associated with the URI;
scan the content resource to locate a block identifier associated with a content block in the content block management system;
extract the block identifier of the content block from within the content resource;
determine, based on the block identifier, a block object within the content block management system corresponding to the content block;
generate a relational connection between the block object and a representation of the third party object, wherein the relational connection is generated by automatically forming a relations property on the content block within the content block management system based on the extracted block identifier determining the block object within the content block management system; and
based on the relational connection, enable two-way connectivity between the block object within the content block management system and the third party object in the external database, wherein enabling the two-way connectivity synchronizes each data change to the block object by updating the third party object with the each data change.

9. The system of claim 8, wherein the block identifier comprises a keyword associated with the content block management system.

10. The system of claim 8, wherein generating the relational connection further comprises:
storing the URI identifying the third party object in the content block management system in association with the block object.

11. The system of claim 8, wherein the two-way connectivity is enabled between the block object and the third party object by synchronizing content updates at the third party object in the external database with the block object within the content block management system.

12. The system of claim 11, wherein the two-way connectivity between the block object and the third party object is enabled through a permissions scheme.

13. The system of claim 11, wherein synchronized data transferred based on the two-way connectivity between the block object and the third party object utilizes an application programming interface connecting the content block management system and the third party system.

14. The system of claim 8, wherein generating the relational connection further comprises:
storing the block identifier extracted from within the content resource at the third party system in association with the third party object.

15. A computer-implemented method, comprising:
providing, by a content block management system, a content connectivity module communicatively coupled to a third party system, the content connectivity module configured to enable one or more permissions associated with a bot;
receiving, at the content block management system, user input to configure the content connectivity module, the user input including a uniform resource identifier (URI) to a content resource at the third party system;
configuring the bot to:
retrieve the content resource based on the URI;
scan the content resource to identify one or more links associated with one or more third party objects stored in an external database at the third party system, each link having a keyword associated with the content block management system; and
extract one or more block identifiers from within the one or more links;
determining, based on the one or more extracted block identifiers, one or more block objects within the content block management system;
generating one or more relational connections between the one or more block objects within the content block management system and the one or more third party objects in the external database, wherein the one or more relational connections are generated by automatically forming a relations property on the one or more block objects within the content block management system based on the one or more extracted block identifiers determining the one or more block objects within the content block management system; and
enabling two-way connectivity between each block object and each third party object, wherein enabling the two-way connectivity synchronizes each data change to the block object by updating the third party object with the each data change.

16. The computer-implemented method of claim 15, wherein enabling the two-way connectivity between each block object and each third party object comprises synchronizing content updates at the third party object in the external database with the block object within the content block management system.

17. The computer-implemented method of claim 15, wherein the two-way connectivity between each block object and each third party object is enabled through a permissions scheme.

18. The computer-implemented method of claim 15, wherein synchronized data transferred based on the two-way connectivity between each block object and each third party object utilizes an application programming interface connecting the content block management system and the third party system.

19. The computer-implement method of claim 15, wherein generating the one or more relational connections further comprises:
   storing each link associated with each third party object in the content block management system in association with the corresponding block object; and
   storing each block identifier extracted from each link at the third party system in association with the corresponding third party object.

\* \* \* \* \*